(12) United States Patent
Lagrandier

(10) Patent No.: US 12,422,062 B2
(45) Date of Patent: Sep. 23, 2025

(54) HINGE ASSEMBLY

(71) Applicant: WinTec Arrowmaker, Inc., Fort Washington, MD (US)

(72) Inventor: Jorma Jon Lagrandier, Tampa, FL (US)

(73) Assignee: WINTEC ARROWMAKER, INC., Fort Washington, MD (US)

( * ) Notice: Subject to any disclaimer, the term of this patent is extended or adjusted under 35 U.S.C. 154(b) by 0 days.

(21) Appl. No.: 18/478,646

(22) Filed: Sep. 29, 2023

(65) Prior Publication Data

US 2025/0109807 A1    Apr. 3, 2025

(51) Int. Cl.
| | | |
|---|---|---|
| *F16L 5/00* | (2006.01) | |
| *F16C 11/04* | (2006.01) | |
| *H02G 3/04* | (2006.01) | |

(52) U.S. Cl.
CPC ............... *F16L 5/00* (2013.01); *F16C 11/04* (2013.01); *H02G 3/0456* (2013.01)

(58) Field of Classification Search
CPC .......... F16L 5/00; F16C 11/04; H02G 3/0456; E05D 7/123; E05D 7/1011
USPC ......... 16/382, 229, 252, 254–256, 277, 286; 49/383, 384, 381; 160/40; 248/200, 248/202.1, 213.1, 220.1, 274.1, 289.11
See application file for complete search history.

(56) References Cited

U.S. PATENT DOCUMENTS

| | | | | |
|---|---|---|---|---|
| 1,893,450 A * | 1/1933 | Shively | ..................... | E05D 3/02 49/400 |
| 6,618,902 B2 * | 9/2003 | Wu | ........................ | E05F 1/1215 16/273 |
| 7,010,832 B2 * | 3/2006 | Chen | ......................... | E05D 5/14 16/235 |
| 7,240,400 B2 * | 7/2007 | Bonham | ................... | E05D 5/06 16/389 |
| 7,444,715 B2 * | 11/2008 | Tu | ........................ | H04M 1/0216 16/284 |
| 7,571,516 B2 * | 8/2009 | Lueffe | ...................... | E05D 5/023 16/382 |
| 7,861,375 B2 * | 1/2011 | Conway | ................... | E05D 7/009 16/256 |
| 7,917,994 B2 * | 4/2011 | Bai | ........................ | E05D 11/105 16/334 |
| 7,921,603 B2 * | 4/2011 | Darnell | ..................... | E06B 1/32 49/504 |

(Continued)

*Primary Examiner* — Terrell L McKinnon
(74) *Attorney, Agent, or Firm* — HULTQUIST, PLLC; Steven J. Hultquist

(57) ABSTRACT

A hinge assembly is described, which includes (i) a first angled member including flanges oriented at substantially right angles to one another and joined to one another at inner edges thereof, (ii) a second angled member including flanges oriented at substantially right angles to one another and joined to one another at inner edges thereof, and (iii) a self-closing spring hinge having leaf elements attached to flanges of the first and second angled members, to provide an assembly that is engageable with an edge portion of a table or counter to provide compressive clamping action on top and bottom surfaces of such edge portion, and which is readily removable and/or repositionable. Such hinge assembly is usefully employed for controlled placement of wires, cords, and cables of devices and appliances positioned on table or counter top surfaces, to improve the organizational utility of such work surfaces.

15 Claims, 10 Drawing Sheets

(56) References Cited

U.S. PATENT DOCUMENTS

| | | | | |
|---|---|---|---|---|
| 8,359,709 B2* | 1/2013 | Van Gennep | ....... | E05D 11/1007 16/229 |
| 8,505,168 B1* | 8/2013 | Chapman | ................ | E05D 11/00 160/40 |
| 8,656,558 B2* | 2/2014 | Van Gennep | ....... | E05D 11/1007 16/229 |
| 8,656,559 B2* | 2/2014 | Hung | ........................ | E05F 5/02 16/369 |
| 9,476,238 B2* | 10/2016 | Mooers | ..................... | E05F 1/12 |
| 10,221,598 B2* | 3/2019 | Dolman | .............. | E05D 11/0054 |
| 11,680,433 B2* | 6/2023 | Stuart | .................. | E05D 5/0246 16/304 |
| 2006/0059662 A1* | 3/2006 | Roeper | ..................... | E05D 9/00 16/382 |
| 2007/0000092 A1* | 1/2007 | Geffe | ..................... | E05D 7/123 16/382 |
| 2007/0284492 A1* | 12/2007 | Oh | ........................ | F16M 13/025 248/220.1 |
| 2009/0106938 A1* | 4/2009 | Mori | ........................ | E05F 1/004 16/277 |
| 2009/0126154 A1* | 5/2009 | Lin | ........................ | G06F 1/1681 16/286 |
| 2011/0214355 A1* | 9/2011 | Kim | ..................... | E05D 11/0054 16/223 |
| 2014/0150345 A1* | 6/2014 | Price | ........................ | E05D 3/022 16/221 |
| 2023/0080352 A1* | 3/2023 | Hall | ........................ | E05D 5/02 16/254 |

* cited by examiner

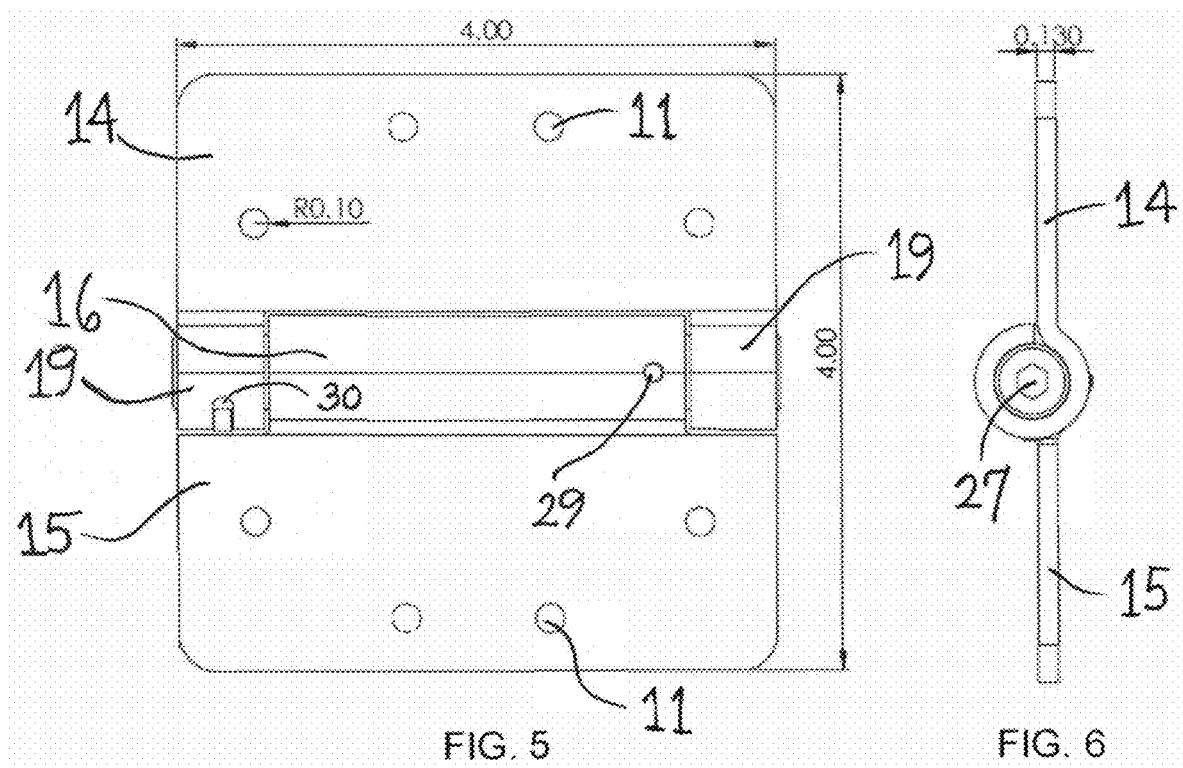

HINGE ASSEMBLY

FIELD

The present disclosure relates to a hinge assembly of a type that may be removably and repositionally secured to a table or counter edge portion solely by compressive clamping action of hinge assembly members at upper and lower surfaces of the table or counter edge portion. The hinge assembly is readily adapted to table or counter edge portions of varied thicknesses, and may be configured to positionally retain electrical cords and wires for tabletop and countertop devices and appliances.

DESCRIPTION OF THE RELATED ART

The proliferation of devices and appliances in contemporary workspaces frequently entails work surfaces being obstructed and cluttered by electrical cords and wires, such that organizational utility of the work surfaces is significantly impaired.

The art has correspondingly attempted to resolve such problem by solutions such as conduits, wireways, and detachable sleeves for aggregating and containing such cords and wires, or folded lengths thereof, but such solutions lack flexibility and ease-of-use, particularly when cords or wires require quick repositioning or lengthening of folded lengths.

In consequence, the art continues to seek improvements and solutions in addressing such issues associated with tabletop and countertop devices and appliances.

SUMMARY

The present disclosure relates to a hinge assembly adapted for ready installation at an edge portion of a table or counter to provide compressive clamping action on top and bottom surfaces of such edge portion, and which is readily removable and/or repositionable.

In one aspect, the disclosure relates to a hinge assembly comprising: (i) a first angled member including flanges oriented at substantially right angles to one another and joined to one another at inner edges thereof; (ii) a second angled member including flanges oriented at substantially right angles to one another and joined to one another at inner edges thereof; (iii) a self-closing spring hinge including (a) a first leaf element joined at an inner edge to a cylindrical channel member having a bore therethrough, the first leaf element being secured to a flange of the first angled member, (b) a second leaf element joined at peripheral edge portions to cylindrical barrel members each having a bore therethrough, the second leaf element being secured to a flange of the second angled member, with the cylindrical channel member of the first leaf element and the cylindrical barrel members of the second leaf element being assembled so that respective bores thereof are aligned to form an aggregate channel bore, (c) a spring element disposed in the aggregate channel bore, (d) a first end cap interiorly disposed in the bore of one of the cylindrical barrel members, the first end cap including an engagement structure coupled with a first end of the spring element, the first end cap being fixedly secured in the bore of the cylindrical barrel member in which it is disposed, (e) a second end cap interiorly disposed in the bore of the other one of the cylindrical barrel members, the second end cap including an engagement structure coupled with a second end of the spring element, the second end cap being fixedly positionally secured in one of multiple fixturing positions in the bore of the cylindrical barrel member in which it is disposed so that the spring element biases the first and second angled members to a closed engagement position, the second end cap including a tool port for rotational adjustment of the second end cap to vary tension of the spring element.

Additional aspects, features and embodiments of the disclosure will be more fully apparent from the ensuing description and appended claims.

BRIEF DESCRIPTION OF THE DRAWINGS

FIG. 5 is a front elevation view of a self-closing spring hinge employed in the hinge assembly of FIG. 1.

FIG. 6 is a side elevation view of the self-closing spring hinge of FIG. 5.

DETAILED DESCRIPTION

Figure 1:
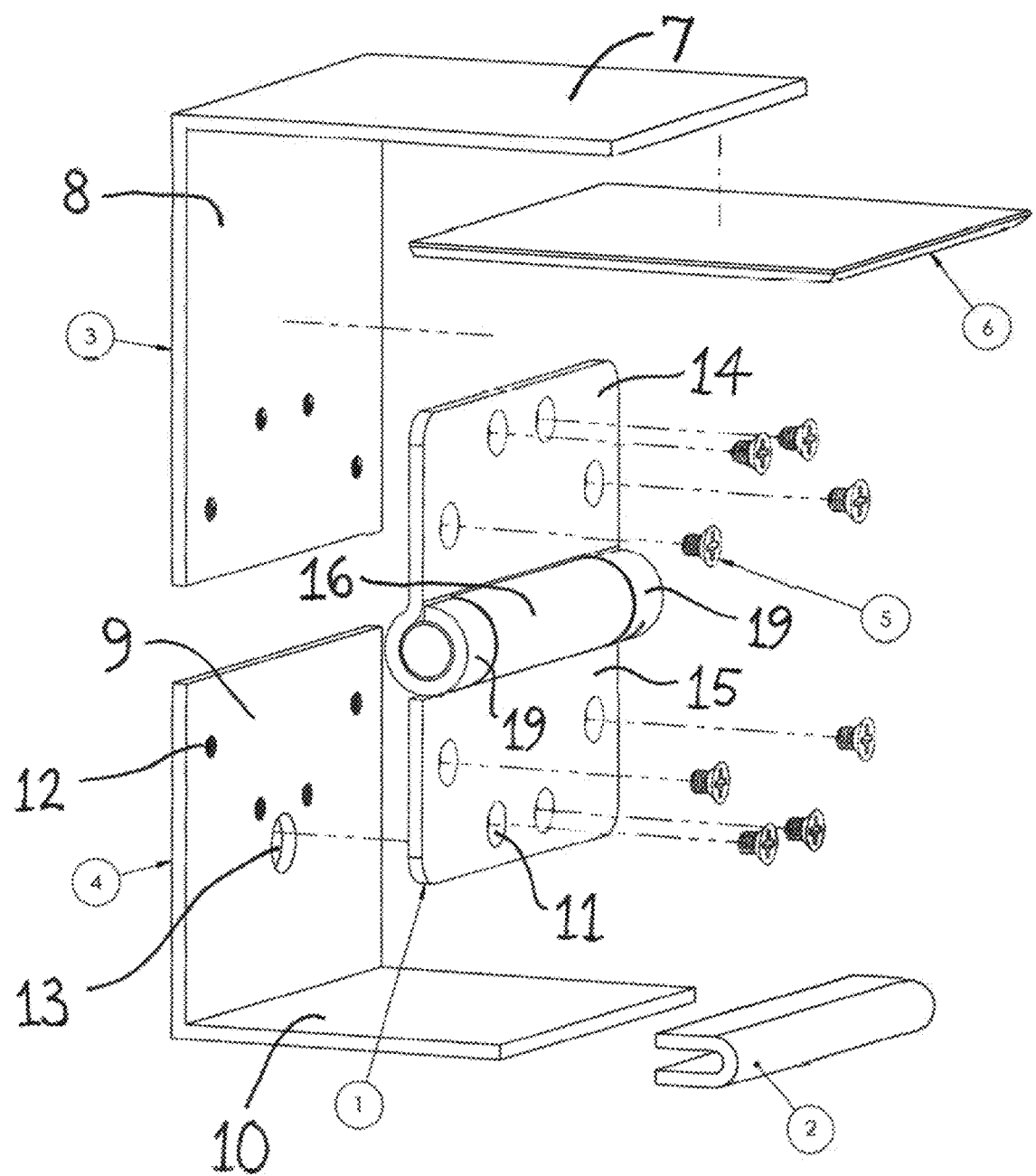
FIG. 1 is an exploded view of a hinge assembly according to one aspect of the present disclosure.

The present disclosure relates to a hinge assembly that may be readily deployed and removably repositioned as desired, e.g., to maintain a desired placement of wires, cords, and cables of devices and appliances that are used on tables, desks, counters, and other structures defining a work surface.

The hinge assembly of the present disclosure, in various embodiments, comprises (i) a first angled member including flanges oriented at substantially right angles to one another and joined to one another at inner edges thereof; (ii) a second angled member including flanges oriented at substantially right angles to one another and joined to one another at inner edges thereof; (iii) a self-closing spring hinge including (a) a first leaf element joined at an inner edge to a cylindrical channel member having a bore therethrough, the first leaf element being secured to a flange of the first angled member, (b) a second leaf element joined at peripheral edge portions to cylindrical barrel members each having a bore therethrough, the second leaf element being secured to a flange of the second angled member, with the cylindrical channel member of the first leaf element and the cylindrical barrel members of the second leaf element being assembled so that respective bores thereof are aligned to form an aggregate channel bore, (c) a spring element disposed in the aggregate channel bore, (d) a first end cap interiorly disposed in the bore of one of the cylindrical barrel members, the first end cap including an engagement structure coupled with a first end of the spring element, the first end cap being fixedly secured in the bore of the cylindrical barrel member in which it is disposed, (e) a second end cap interiorly disposed in the bore of the other one of the cylindrical barrel members, the second end cap including an engagement structure coupled with a second end of the spring element, the second end cap being fixedly positionally secured in one of multiple fixturing positions in the bore of the cylindrical barrel member in which it is disposed so that the spring element biases the first and second angled members to a closed engagement position, the second end cap including a tool port for rotational adjustment of the second end cap to vary tension of the spring element.

The hinge assembly may in various embodiments be constructed so that in the closed engagement position, flanges of the first and second angled members not secured to leaf elements of the self-closing spring hinge are in spaced apart relationship at their outer extremities.

The hinge assembly may in various embodiments be constructed so that in the closed engagement position, flanges of the first and second angled members not secured to leaf elements of the self-closing spring hinge are generally orthogonal to one another.

The hinge assembly may in various embodiments be constructed so that in the closed engagement position, flanges of the first and second angled members not secured to leaf elements of the self-closing spring hinge define a gap between their outer extremities that when engaged with a structure having a thickness greater than the gap dimension exerts a compressive clamping force on the structure.

The hinge assembly in various implementations may be constructed so that height, width, or length dimensions of flanges of one of the first and second angled members are shorter than corresponding height, width, or length dimensions of flanges of the other one of the first and second angled members.

The hinge assembly may be adapted to clampingly engage an outer edge of a structure having top and bottom surfaces so that an outer flange of one of the first and second angled members is in compressive bearing contact on the top surface of the structure at such edge portion, and the outer edge of the outer flange of the other one of the first and second angled members bears compressively against the bottom surface of the structure.

The hinge assembly may be formed of any suitable materials of construction. For example, the first and second angled members and the self-closing spring may be formed of metal or metal alloy, e.g., steel, brass, bronze, iron, or aluminum, wood, plastic, ceramic, or other suitable material or materials such as composites and laminates.

The hinge assembly may be constructed, wherein flanges of the first and second angled members not secured to leaf elements of the self-closing spring hinge further comprise on an outer edge of one of such flanges a U-shaped cushioning element and on an undersurface of the other one of such flanges a sheet-form cushioning element.

Such cushioning elements may likewise be formed of any suitable materials of construction, and may for example comprise elastomeric material, such as a natural or synthetic rubber, polyurethane elastomer, or other appropriate material of a resilient and cushioning character.

The hinge assembly is advantageously constructed, with at least one of the flanges of the first and second angle members having an opening therein to accommodate feedthrough of cords, wires, and/or cables. By such arrangement, the hinge assembly may be selectively positioned and/or repositioned so as to positionally fix cords, wires, and/or cables so that they are organized and placed to maximize the utility of the structure on which the hinge assembly is compressively clamped. Thus, when the structure is a tabletop, countertop, or the like, the cords, wires, and/or cables can be aggregated and placed at the edge portion of the tabletop or countertop so that they do not become entangled or otherwise interfere with the organizational character of the tabletop or countertop work surface.

Additionally, or alternatively, the hinge assembly may be equipped with hooks, rings, or other retention structures to organize and selectively position cords, wires, and/or cables so that they do not become entangled or otherwise interfere with one another or with associated devices or appliances on the work surface of the structure at the edge portion of which the hinge assembly is deployed. In various specific embodiments, the retention structures may include quick-release hook-and-loop fasteners that can be used to circumscribe and positionally retain a bundle of cords, wires, and/or cables.

The end caps of the hinge assembly may be configured and arranged in any suitable manner to engage the spring element that is utilized to bias the hinge assembly to the closed engagement position. For example, the spring element may be configured as a helical coiled spring having linear terminal ends, and the end caps may be configured and arranged with slots in which the terminal ends are retentively positioned, or the end caps may be configured and arranged with protrusion elements extending from an interior face of each of the end caps, so as to provide and define a slot therebetween in which the linear terminal end of the spring element is disposed.

Any other suitable coupling means or structure for engaging the end caps with the spring element may be employed, so that the spring is selectively tensionable as appropriate to exert a desired compressive clamping action on the edge portion of the structure to which it is clamped.

In various embodiments, one of the end caps is fixedly secured in position by a pin in a corresponding hole in such end cap, and with the other one of the end caps being adapted to be rotated via a spring tensioning adjustment tool port in a circumferentially extending slot in the cylindrical barrel member associated with such other end cap, to a position at which the selected degree of tensioning of the spring element is achieved, as is hereinafter more fully described with reference to an illustrative embodiment of the hinge assembly.

Referring now to the drawings, FIG. 1 is an exploded view of a hinge assembly according to one aspect of the present disclosure. In such instance assembly, a self-closing spring hinge 1 is shown in an open position with an upper hinge leaf 14 of a planar conformation, such upper hinge leaf 14 being integrally formed with cylindrical barrel members 19 at respective lower side portions thereof. The self-closing spring hinge 1 also includes a lower hinge leaf 15 of a planar conformation, such lower hinge leaf 15 being integrally formed with a cylindrical channel member 16 at an upper medial portion thereof. It will be recognized that the planar hinge leaves may alternatively be of non-integral formation with respect to associated cylindrical channel member and cylindrical barrel member elements, wherein the leaf and cylindrical channel member, or the leaf and cylindrical barrel members, may be joined to one another with mechanical fasteners, or may be welded, brazed, or otherwise bonded to one another, or may be coupled together in any other suitable manner.

Each of the hinge leaves is provided with mechanical fastener openings 11 therein which are registrable with mechanical fasteners threaded openings 12 in the inner flanges 8 and 9 of the respective upper angled member 3 and lower angled member 4, as shown in FIG. 1. When thus registered with one another, the leaves of the hinge may be joined to the respective inner flanges 8 and 9 of the angled members 3 and 4 by mechanical fasteners 5, which may comprise screws as shown in FIG. 1, or alternatively may comprise other mechanical fasteners of suitable type and character. In lieu of such mechanical fasteners, the respective leaves of the hinge may be secured to inner flanges of the respective angled members by other joining methods such as welding, brazing, bonding, etc.

The upper angled member 3 includes the outer flange 7 and inner flange 8 joined to one another at inner edges thereof, wherein the inner and outer flanges are oriented at substantially right angles to one another. The lower angled member 4 includes inner flange 9 and outer flange 10 joined to one another at inner edges thereof, wherein the inner and outer flanges are oriented at substantially right angles to one another.

As used in such context, the term "at substantially right angles to one another" in reference to the respective flanges of the angled member means that the included angle between the respective flanges is in a range of from 75° to 105°, preferably in a range of from 80° to 100°, more preferably in a range of from 85° to 95°, and most preferably is 90°.

In the FIG. 1 embodiment, the outer flange 7 of angled member 3 has a bottom surface (undersurface) on which is disposed a sheet-formed cushioning element 6. Such cushioning element serves to provide a deformable, resilient layer between the outer flange bottom surface and the top surface of the structure engaged by the hinge assembly. In such FIG. 1 embodiment, the outer flange 10 of angled member 4 has a U-shaped cushioning element 2 on its outer terminal edge region, to provide a deformable, resilient layer between the outer flange terminal edge region and the undersurface of the structure that is engaged by the hinge assembly.

The inner flange 9 of the angled member 4 in the illustrative FIG. 1 embodiment has a generally central cord, wire, cable throughport opening 13, by which cords, wires, and cables can pass through the opening for subsequent connection thereof to devices and/or appliances on the top surface of the structure to which the hinge assembly is clamped. In such manner, the hinge assembly serves to aggregate and position the cords, wires, and cables so that they are positionally organized and do not obstruct or impair the utility of the top surface of the structure to which the hinge assembly is affixed.

Figure 2:
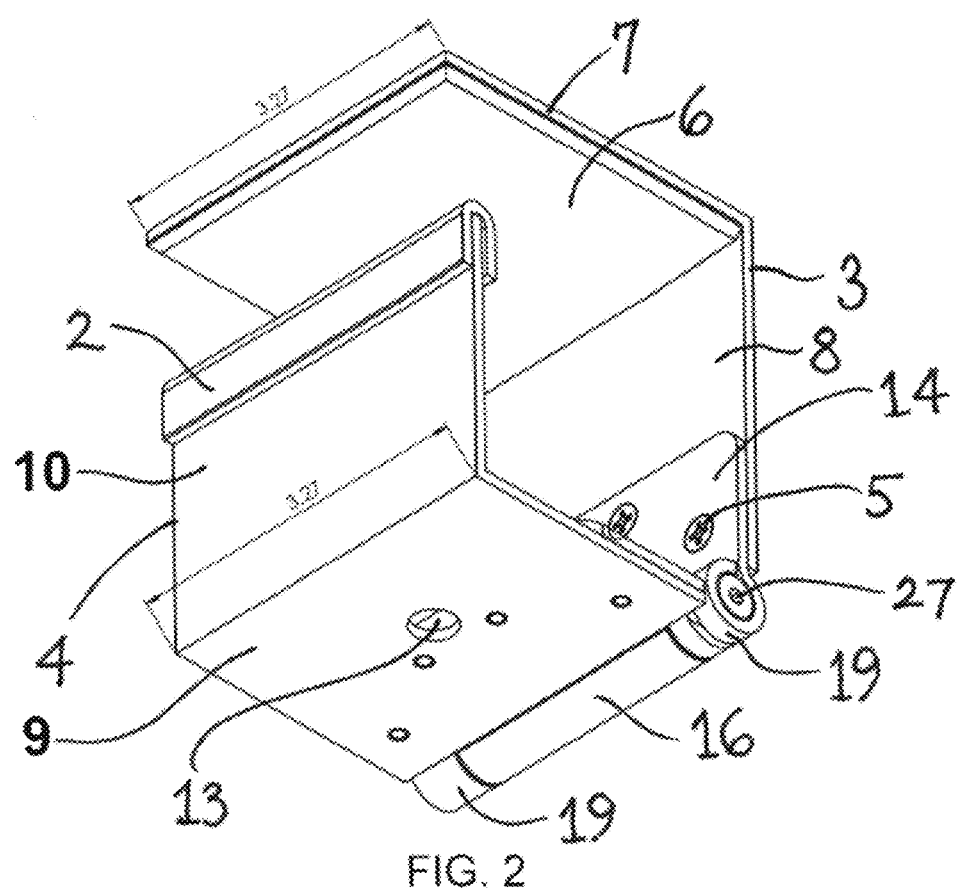
FIG. 2 is a bottom perspective view of the hinge assembly of FIG. 1.

FIG. 2 is a bottom perspective view of the hinge assembly of FIG. 1, wherein all parts and components are correspondingly numbered with respect to the numbering of such parts and components in FIG. 1. The hinge assembly in FIG. 2 is shown in the closed engagement position, having a vertical gap between the outer edge of flange 7 of the upper angled member 3 and the outer edge of flange 9 of the lower angled member 4, so that the outer edge portion of sheet-form cushioning element 6 on flange 7 and the outer edge extremity of the U-shaped cushioning element 2 are in facing relationship to one another, as a result of the corresponding biasing action of the self-closing spring hinge. It will therefore be apparent that the hinge assembly can be manually opened to expand the opening of such gap, to accommodate passage of an edge portion of a tabletop or countertop or other structure through such manually expanded gap, subsequent to which the manually retracted hinge assembly can be released into clamping contact with the structure edge portion, so that the sheet-form cushioning element 6 reposes on the top surface of the structure and so that the upper extremity of the U-shaped cushioning element 2 contacts the undersurface of the structure. In such manner, the hinge assembly is positioned on and compressively clamped to the edge portion of the structure to which it is applied.

Figure 3:
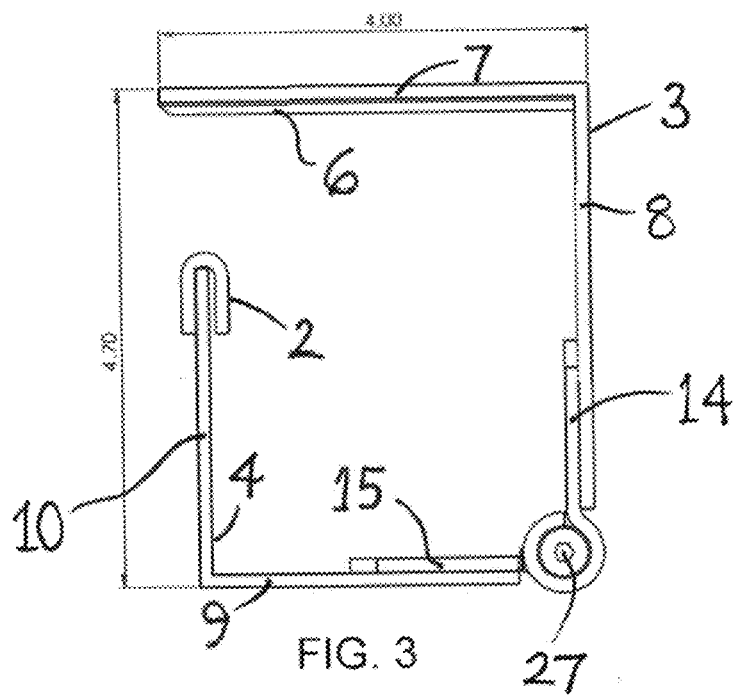
FIG. 3 is a side elevation view of the hinge assembly of FIG. 1, in a closed engagement position.
Figure 4:
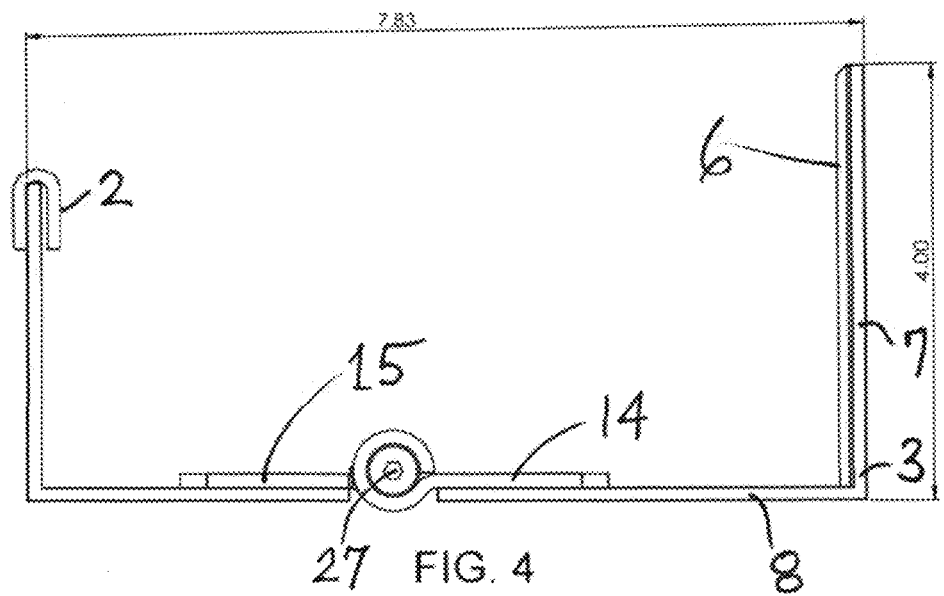
FIG. 4 is a side elevation view of the hinge assembly of FIG. 1, in a fully retracted open position.

FIG. 3 is a side elevation view of the hinge assembly of FIG. 1, in the closed engagement position, and FIG. 4 is a side elevation view of the hinge assembly of FIG. 1, in a retracted open position, wherein all parts and components in FIGS. 3 and 4 are correspondingly numbered with respect to the numbering of such parts and components in FIGS. 1 and 2.

FIG. 5 is a front elevation view of the self-closing spring hinge 1 shown in the hinge assembly of FIG. 1. As depicted in FIG. 5, the spring hinge includes hinge leaf 14 containing mechanical fastener openings 11, and integrally formed with the laterally peripheral cylindrical barrel members 19, and hinge leaf 15 containing mechanical fastener openings 11, and integrally formed with the medial cylindrical channel member 16, so that the cylindrical channel member and the cylindrical barrel members can be assembled so that when assembled, the respective bores thereof are aligned to form an aggregate channel bore. The aggregate channel bore thus formed contains the end caps described more fully hereinafter, as well as the spring to which the end caps are coupled.

As shown in FIG. 5, the left-hand cylindrical barrel member 19 has a slot 30 therein, which is engaged by an associated pin, and the cylindrical channel member 16 at its right-hand portion has a hole in which a pin 29 is deployed, as hereinafter more fully described. FIG. 5 shows the mechanical fastener openings 11 as having a radius of 0.10 inch (R0.10).

The self-closing spring hinge is illustrated in FIG. 5 in an open extended position with the respective hinge leaves 14 and 15 parallel to one another, as depicted in FIG. 6, which is a side elevation view of the self-closing spring hinge of FIG. 5. FIG. 5 shows the spring tensioning adjustment tool port 27 in the associated end cap, which in the illustrated embodiment is a hexagonal port for insertion of an enageably matable hexagonal tool, such as for example a hexagonally shaped allen wrench. By such arrangement, a spring tensioning mechanism is provided to adjust tension of the spring element of the self-closing spring hinge. As shown in the specific embodiment illustrated in FIG. 6, the thickness of the respective hinge leaves 14 and 15 is 0.130 inch, although the disclosure is not limited thereto.

It will therefore be appreciated that the dimensions of the hinge assembly and components shown in FIGS. 2-6 in inches are of an illustrative character for the embodiments depicted in such drawings, but the disclosure is not limited thereto, and other sizes and dimensions may be employed in other implementations of the hinge assembly of the disclosure.

Figure 7:
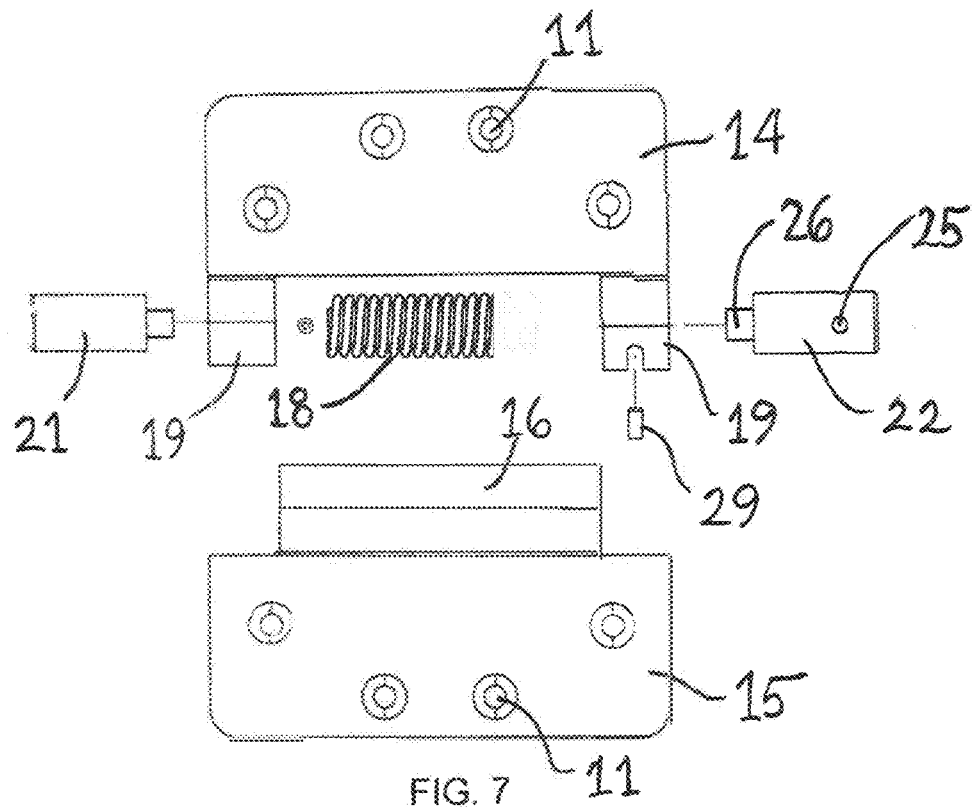
FIG. 7 is an exploded front elevation view of the self-closing spring hinge of FIG. 5.

FIG. 7 is an exploded front elevation view of the self-closing spring hinge of FIG. 5, showing the details of construction thereof. As previously described, the hinge leaf 14 contains mechanical fastener openings 11 and is integrally formed with the transversely peripheral cylindrical barrel members 19, and the hinge leaf 15 contains mechanical fastener openings 11 and is integrally formed with the medial cylindrical channel member 16, whereby the cylindrical channel member and the cylindrical barrel members are assembled so that the respective bores thereof are aligned to form an aggregate channel bore containing the spring 18 and the end caps 21 and 22. The end caps 21 and 22 each include engagement structure 26 at their respective inner faces, for engaging the spring 18, and end cap 22 also comprises an opening (hole 25) for receiving the pin 29 that is inserted through the slot in cylindrical barrel member 19.

Figure 8:
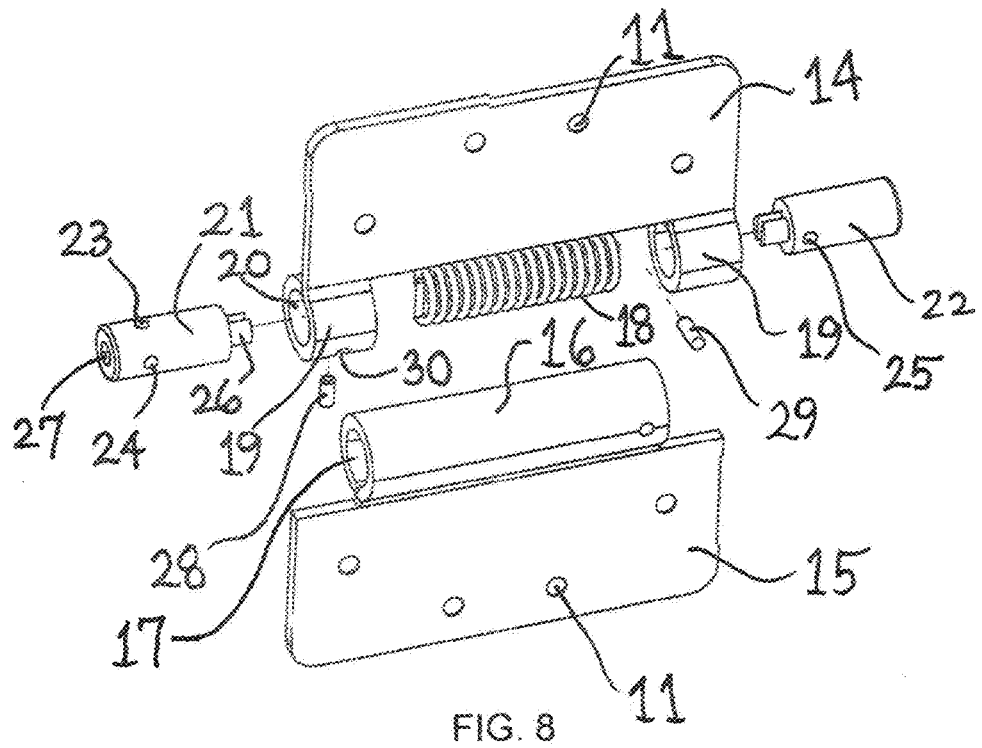
FIG. 8 is an exploded perspective view of the self-closing spring hinge of FIG. 5.

FIG. 8 is an exploded perspective view of the self-closing spring hinge of FIG. 5 further showing the details thereof. As illustrated, the end cap 21 contain holes 23 and 24 therein, with one of such holes being selectively engageable by pin 28 inserted through slot 30 in the cylindrical barrel member 19. The end cap 21 on its outer face has a spring tensioning adjustment tool port 27 as previously described, and such end cap shows the engagement structure 26 to comprise two protrusion elements for coupling to the linear end segment of the spring 18. Such engagement structure is also shown on end cap 22, which has a hole 25 therein that is engaged by the pin 29 inserted through the hole in cylindrical chamber member 16 at the right hand end portion of the cylindrical chamber member as depicted in FIG. 8. The central cylindrical chamber member 16 includes a bore 17. In the assembled hinge assembly, the bore 17 of the central cylindrical chamber is aligned with the bores 20 of the cylindrical barrel members 19, so that the bore 17 of the central cylindrical chamber 16 and the bores 20 of each of the cylindrical barrel members 19 of each of the cylindrical barrel members 19 are aligned to form an aggregate channel bore.

Figure 9:
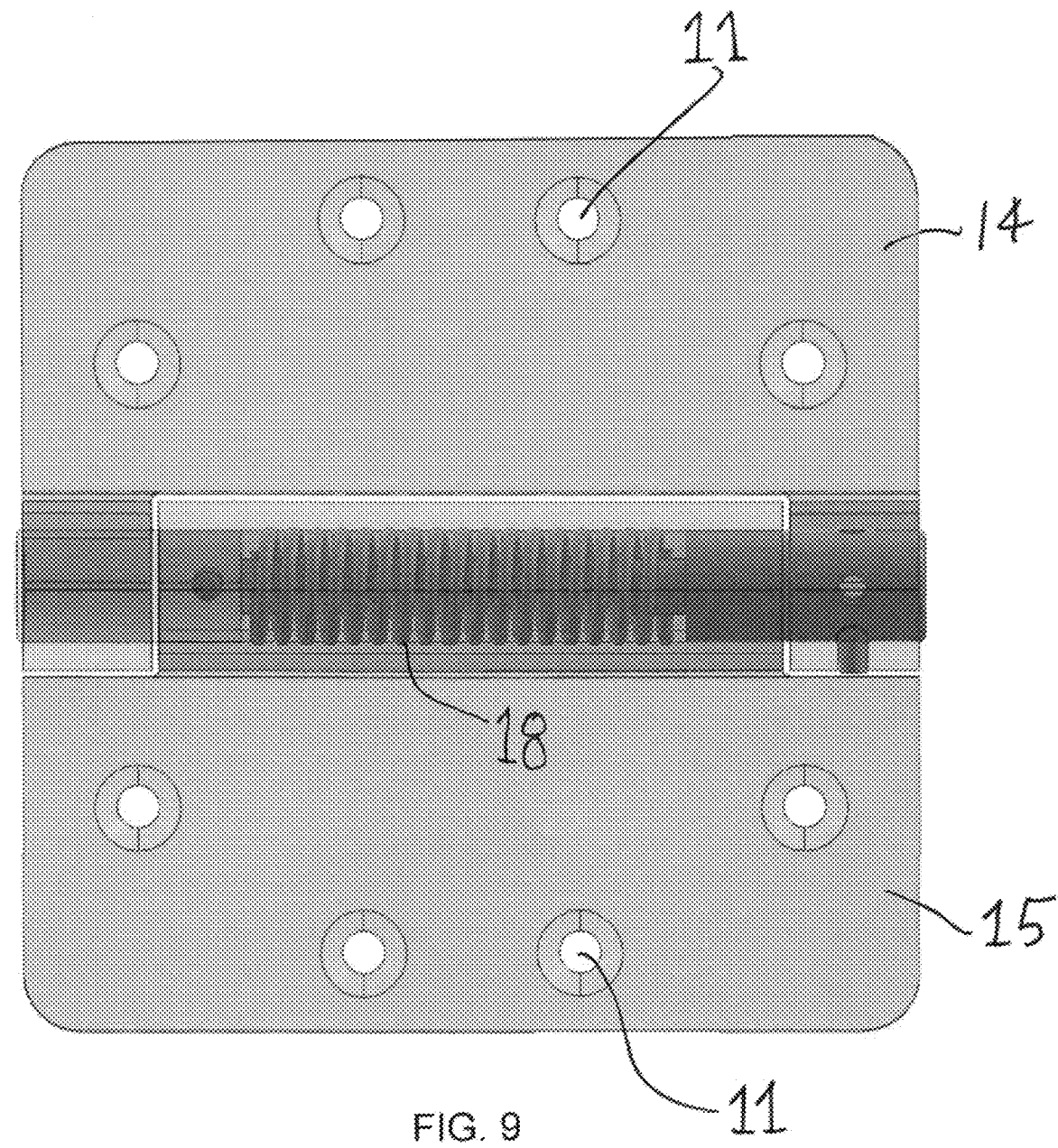
FIG. 9 is a front elevation view of the self-closing spring hinge of FIG. 5 in which the middle portion of the hinge is transparently rendered to show the internal components thereof.

FIG. 9 is a front elevation view of the self-closing spring hinge of FIG. 5 in which the middle portion of the hinge is transparently rendered to show the internal components thereof, including spring 18 and the respective end caps that are coupled to the spring.

Figure 10:
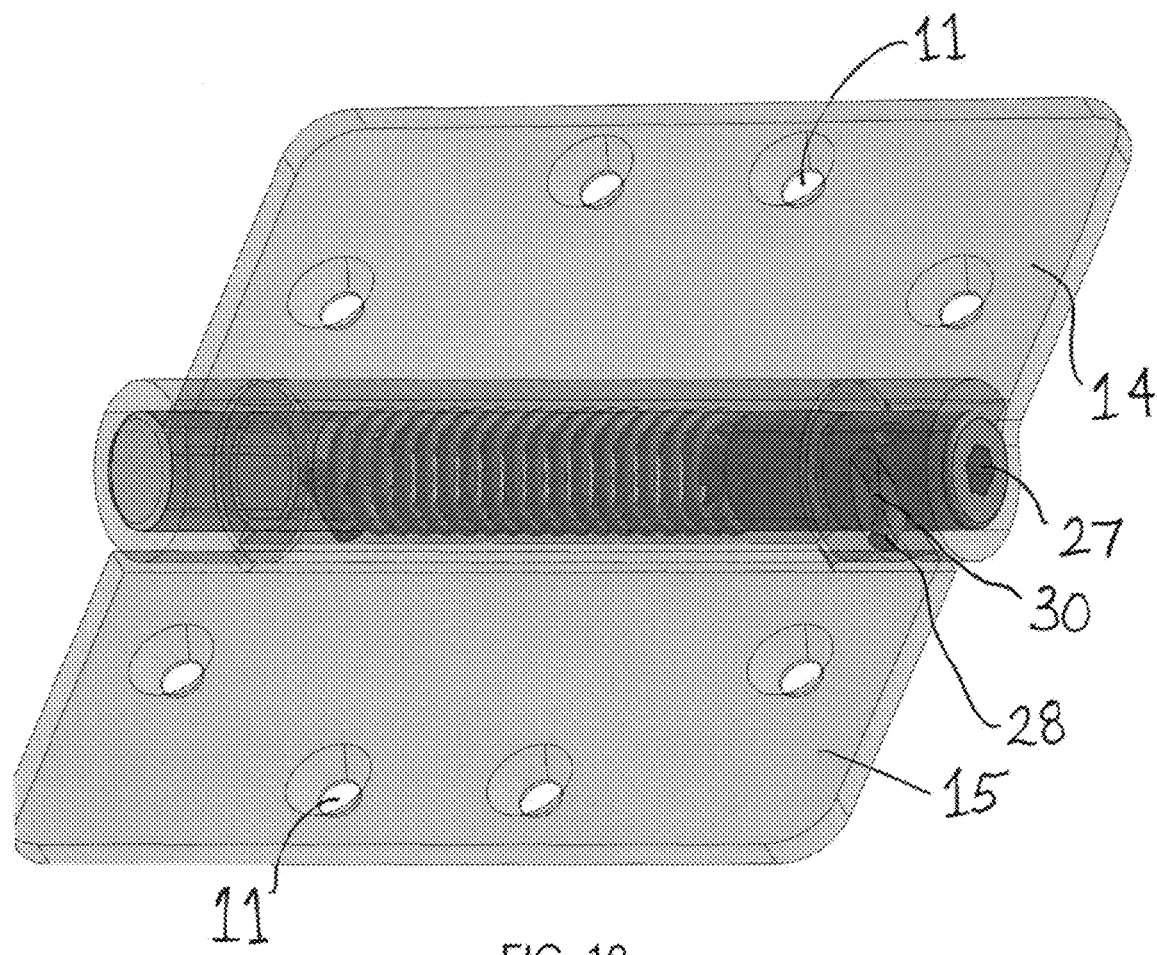
FIG. 10 is a perspective view of the self-closing spring hinge shown in FIG. 9 showing additional details thereof.

FIG. 10 is a perspective view of the self-closing spring hinge shown in FIG. 9 showing additional details thereof, including the spring tensioning adjustment tool port 27 on the exterior face of the end, and slot 30 in the cylindrical barrel member in which pin 28 engages the associated end cap.

Figure 11:
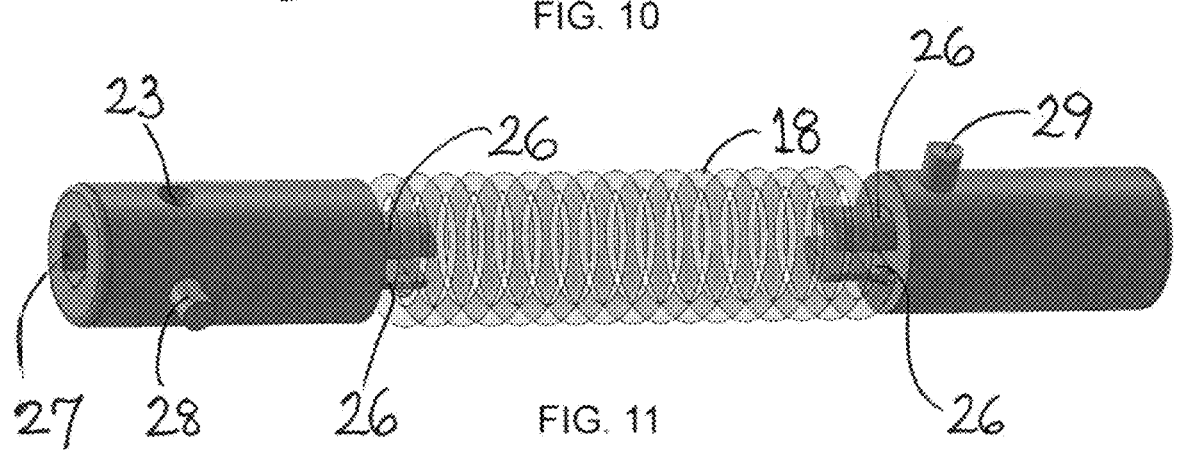
FIG. 11 is a perspective view of the end caps, pins, and spring elements of the self-closing spring hinge of FIG. 10.

FIG. 11 is a perspective view of the end caps, pins 28 and 29, hole 23, spring tensioning adjustment tool port 27, engagement structures 26, and spring 18 of the self-closing spring hinge of FIG. 10.

Figure 12:
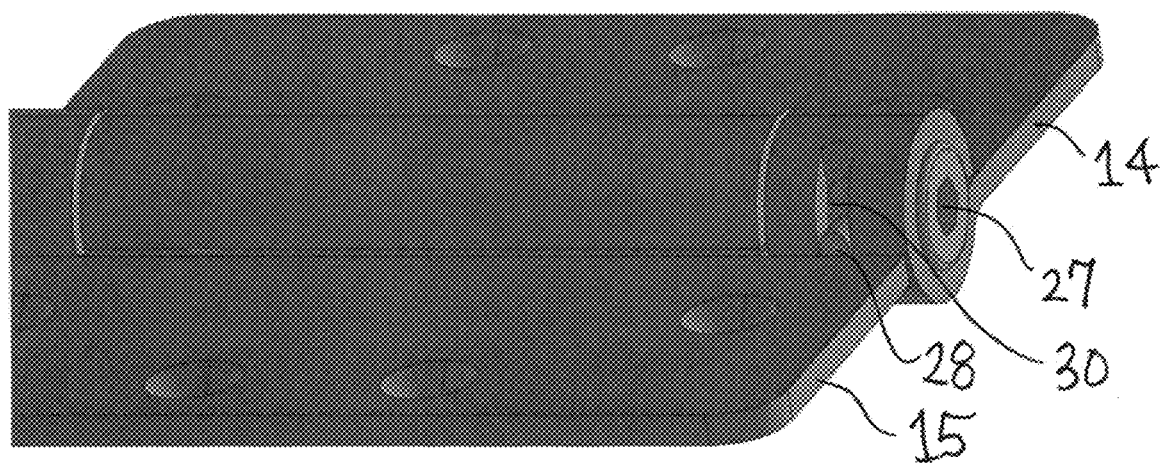
FIG. 12 is a perspective view of a portion of the self-closing spring hinge of FIGS. 5-11, showing the details of an end cap having and a spring tensioning adjustment tool port, a slot in the cylindrical barrel member and a pin disposed in the slot to position the associated end cap.

FIG. 12 is a perspective view of a portion of the self-closing spring hinge of FIGS. 5-11, showing the details of an end cap having pin 28 inserted through slot 30 in the cylindrical barrel member and a spring tensioning adjustment tool port 27 in the end cap.

Figure 13:
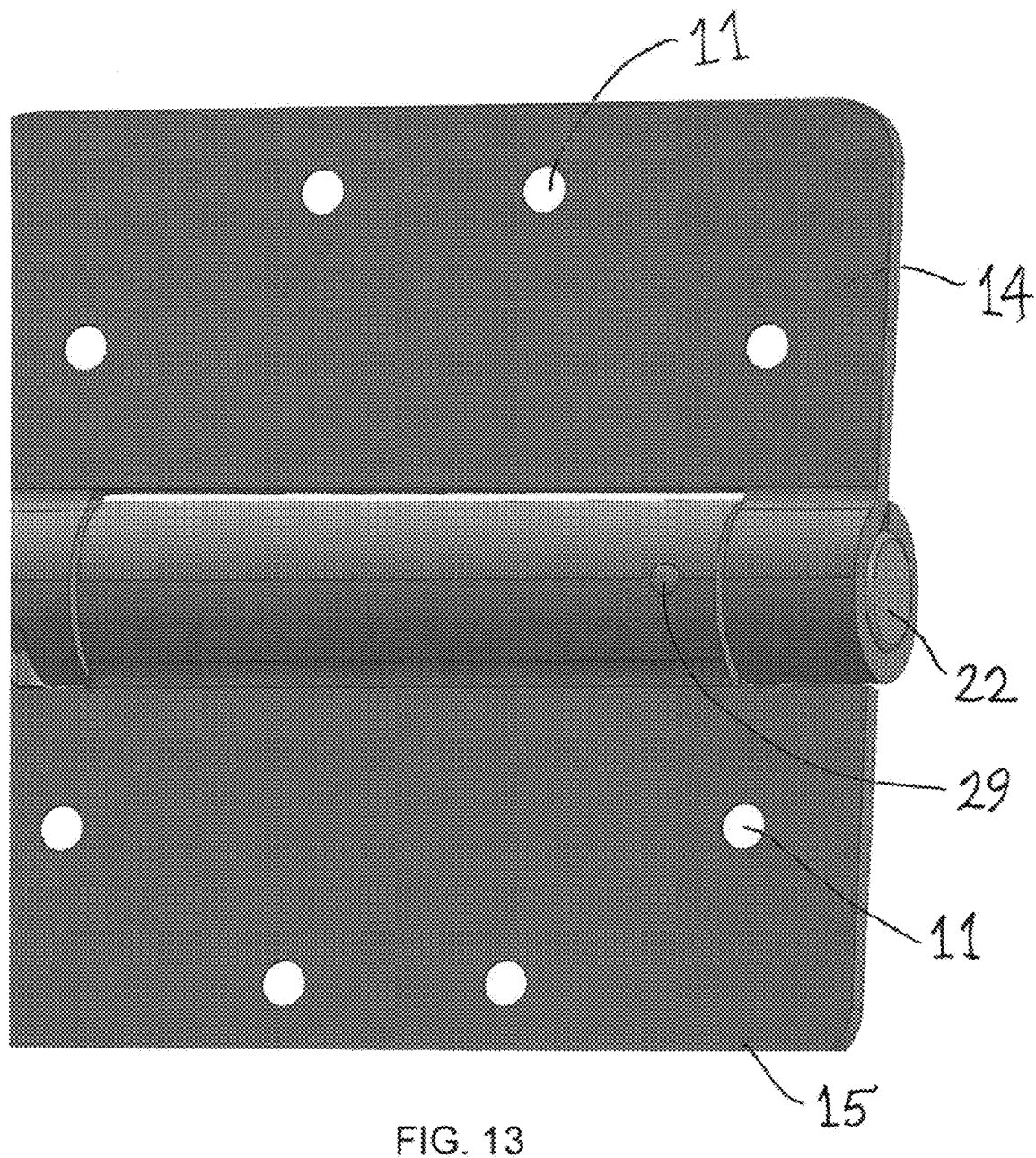
FIG. 13 is a perspective view of a portion of the self-enclosing spring hinge of FIGS. 5-11, showing the details of the other end cap of the self-closing spring hinge, opposite the end cap shown in FIG. 12, and the associated pin element.

FIG. 13 is a perspective view of a portion of the self-enclosing spring hinge of FIGS. 5-11, showing the details of the other end cap of the self-closing spring hinge, opposite the end cap shown in FIG. 12, with the associated pin element 29 inserted in the corresponding hole in the cylindrical chamber member to engage a hole in the end cap (see hole 25 in end cap 22 as shown in the exploded view of FIG. 8.

Figure 14:
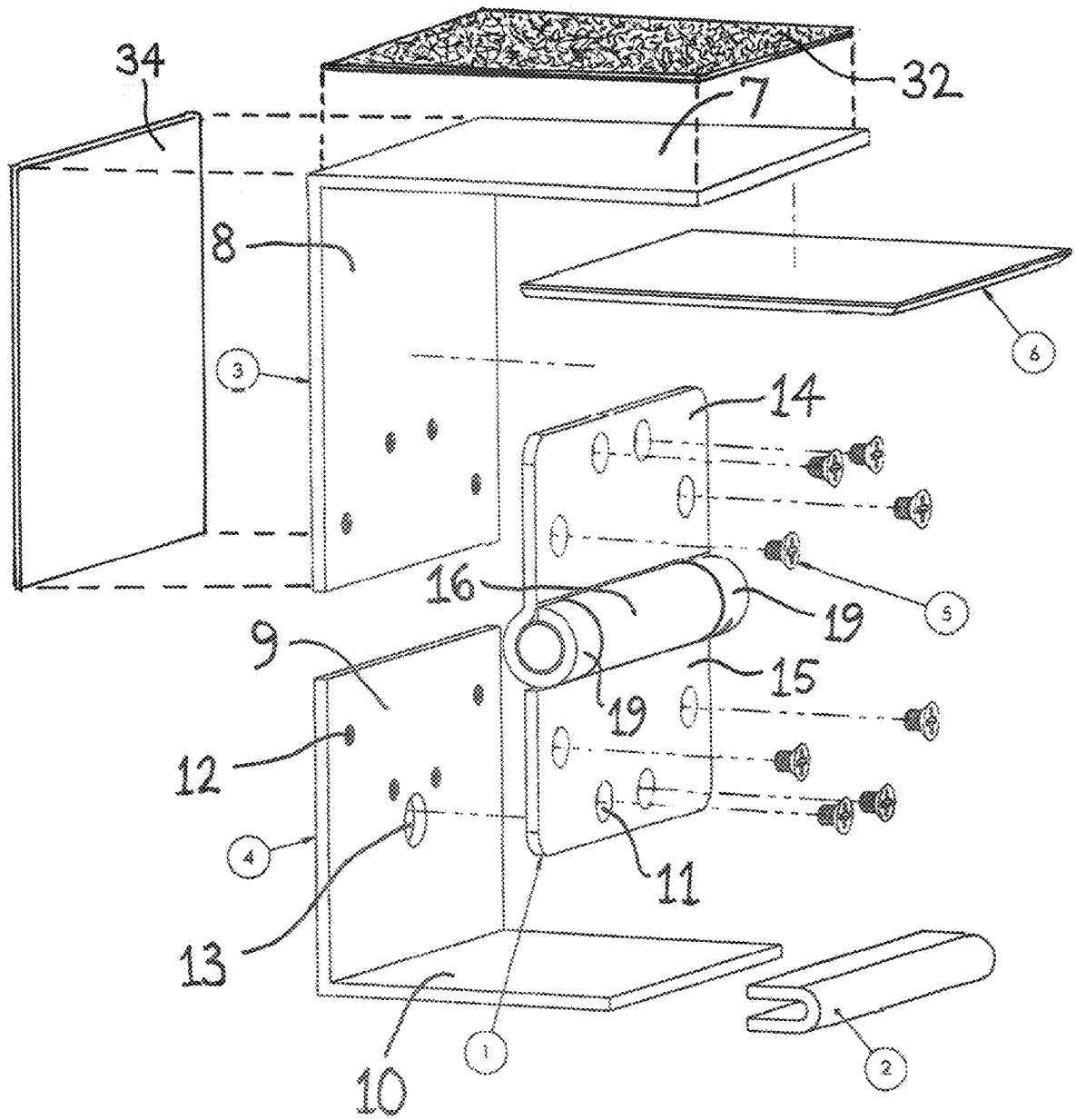
FIG. 14 is an exploded view of a hinge assembly of the type shown in FIG. 1, as modified by attachment of hook and loop fastener sheets to the outer flange and inner flange of the upper angled member of the hinge assembly.

FIG. 14 is an exploded view of a hinge assembly of the type shown in FIG. 1, wherein all parts and components are correspondingly numbered with respect to the numbering of the same parts and components in FIG. 1, wherein the hinge assembly is modified by attachment of hook and loop fastener sheet 32 to the top surface of the outer flange 7 of the upper angled member 3 of the hinge assembly, and wherein the hinge assembly is modified by attachment of hook and loop fastener sheet 34 to the back surface of inner flange 8 of the upper angled member 3 of the hinge assembly.

The fastener sheets 32 and 34 may be secured to the respective surfaces of the flanges of the angled member 3 in any suitable manner, such as adhesive bonding, ultrasonic welding, riveting or other mechanical fastener attachment. The fastener sheets may be secured over the full areas of the flange surfaces on which they are disposed, so that the hook and loop fastener sheets then can be mated on their respective facing surfaces with correspondingly engaged hook and loop fastener sheets, hook and loop fastener straps, or other hook and loop fastener elements, to positionally secure cords, wires, and/or cables at the flange surfaces, or so that the hook and loop fastener sheets can be mated on their facing surfaces with hook and loop fastener sheets, straps, or elements associated with signage or devices such as network switches or electrical power strips, to positionally secure such signage or devices at a desired location by the hinge assembly.

In such manner, a static mounting locus can be provided for a wide variety of common objects, to prevent them from falling off a table, counter, or other mounting structure to which the hinge assembly is clampingly secured, and in the case of devices such as network switches or electrical power strips, the hinge assembly also provides close access of such devices to associated cords, wires, and/or cables that are likewise positionally fixed by the hinge assembly as previously described herein.

The hook and loop fasteners employed for such purpose may be of any suitable type, such as hook and loop fasters commercially available under the trademarks VELCRO®, DuraGrip®, Scotchmate™, and Dual Lock™. It will be understood that the hook and loop fastener sheets, strips, straps, tapes, etc. may be hook element fasteners, loop element fasteners, or hook element and loop element fasteners, as fasteningly engageable with complementary mating hook and/or loop fasteners to provide securement structures in the hinge assembly for securing cords, wires, and/or cables, and/or for securing objects such as signage, and electrical and electronic devices It will be appreciated from the foregoing that the hinge assembly of the disclosure can be implemented and embodied in a variety of specific configurations, consistent with the disclosure herein, for ready manual installation at an edge portion of a structure providing a surface on which devices or appliances are utilized that require cords, wires, and/or cables for their operation.

Further, while the disclosure has been primarily directed to a hinge assembly for use in organizing and positioning of cords, wires, and/or cables, it will be appreciated that the utility of the hinge assembly of the disclosure is not thus limited, and that the hinge assembly may be utilized for any other purposes or applications, in addition to those already discussed, such as for example clamping of materials to cantilevered structures, securing tablecloths to tables in outdoor or windy conditions, anchoring linens and blankets on platform beds, stationarily retaining papers, books, and documents on work surfaces, etc. The readily effected manual installation and subsequent removal or repositioning of the hinge assembly enables it to be utilized in a wide variety of uses and applications, and with a variety of receiving structures, by simple manual retractive opening of the respective angled members for engagement of, or disengagement from, an associated recipient structure.

Set out below is an identification of the reference numbers used in the drawings herein and the corresponding elements, features, components, and structures denoted by such reference numbers.

1 self-closing spring hinge
2 U-shaped cushioning element
3 angled member
4 angled member
5 mechanical fasteners
6 sheet-form cushioning element
7 outer flange of angled member
8 inner flange of angled member
9 inner flange of angled member
10 outer flange of angled member
11 mechanical fastener openings
12 mechanical fastener threaded openings
13 cord, wire, cable throughport opening
14 hinge leaf
15 hinge leaf
16 cylindrical channel member
17 bore
18 spring
19 cylindrical barrel member
20 bore
21 end cap
22 end cap
23 hole
24 hole
25 hole
26 engagement structure protrusion element
27 spring tensioning adjustment tool port
28 pin
29 pin
30 slot
32 hook and loop fastener sheet
34 hook and loop fastener sheet While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A hinge assembly comprising:
   (i) a first angled member including flanges oriented at substantially right angles to one another and joined to one another at inner edges thereof;
   (ii) a second angled member including flanges oriented at substantially right angles to one another and joined to one another at inner edges thereof; and
   (iii) a self-closing spring hinge including
      (a) a first leaf element joined at an inner edge to a cylindrical channel member having a bore therethrough, the first leaf element being secured to a flange of the first angled member,
      (b) a second leaf element joined at peripheral edge portions to cylindrical barrel members each having a bore therethrough, the second leaf element being secured to a flange of the second angled member, with the cylindrical channel member of the first leaf element and the cylindrical barrel members of the second leaf element being assembled so that respective bores thereof are aligned to form an aggregate channel bore,
      (c) a spring element disposed in the aggregate channel bore,
      (d) a first end cap interiorly disposed in the bore of one of the cylindrical barrel members, the first end cap including an engagement structure coupled with a first end of the spring element, the first end cap being fixedly secured in the bore of the cylindrical barrel member in which it is disposed, and
      (e) a second end cap interiorly disposed in the bore of the other one of the cylindrical barrel members, the second end cap including an engagement structure coupled with a second end of the spring element, the second end cap being fixedly positionally secured in one of multiple fixturing positions in the bore of the cylindrical barrel member in which it is disposed so that the spring element biases the first and second angled members to a closed engagement position, the second end cap including a tool port for rotational adjustment of the second end cap to vary tension of the spring element,
   wherein in the closed engagement position, flanges of the first and second angled members not secured to leaf elements of the self-closing spring hinge are generally orthogonal to one another.

2. The hinge assembly of claim 1, wherein in the closed engagement position, flanges of the first and second angled members not secured to leaf elements of the self-closing spring hinge are in spaced apart relationship between their outer extremities.

3. The hinge assembly of claim 1, wherein in the closed engagement position, the flange of the first angled member not secured to the first leaf element of the self-closing spring hinge is generally parallel to the flange of the second angled member secured to the second leaf element, and the flange of the second angled member not secured to the second leaf element of the self-closing spring hinge is generally parallel to the flange of the first angled member secured to the first leaf element.

4. The hinge assembly of claim 1, wherein in the closed engagement position, flanges of the first and second angled members not secured to leaf elements of the self-closing spring hinge define a gap between their outer extremities that when engaged with a structure having a thickness greater than the gap dimension exerts a compressive clamping force on the structure.

5. The hinge assembly of claim 1, wherein height, width, or length dimensions of flanges of one of the first and second angled members are shorter than corresponding height, width, or length dimensions of flanges of the other one of the first and second angled members.

6. The hinge assembly of claim 1, wherein flanges of the first and second angled members not secured to leaf elements of the self-closing spring hinge further comprise on an outer edge of one of said flanges a U-shaped cushioning element and on an undersurface of the other one of said flanges a sheet-form cushioning element.

7. The hinge assembly of claim 6, wherein said cushioning elements are formed of an elastomeric material.

8. The hinge assembly of claim 7, wherein said elastomeric material comprises a natural or synthetic rubber material.

9. The hinge assembly of claim 1, wherein at least one of the flanges of one of the first and second angled members has an opening therein to accommodate feedthrough of cords, wires, and/or cables.

10. The hinge assembly of claim 1, wherein the engagement structure coupled with the first end of the spring element and the engagement structure coupled with the second end of the spring element each comprise protrusion elements defining a slot receiving a corresponding end of the spring element.

11. The hinge assembly of claim 1, wherein an outer facing surface of at least one of the flanges of the first and second angled members has a securement element thereon.

12. The hinge assembly of claim 11, wherein the securement element comprises hook and loop fastener material.

13. The hinge assembly of claim 12, wherein the hook and loop fastener material is secured to the outer facing surface by adhesive bonding, ultrasonic welding, or mechanical fastener attachment.

14. The hinge assembly of claim 13, wherein the hook and loop fastener material is in a form of a sheet, strip, strap, or tape.

15. The hinge assembly of claim 1, comprising a spring tensioning mechanism to adjust tension of the spring element of the self-closing spring hinge.

\* \* \* \* \*